Patented May 18, 1954

2,678,870

UNITED STATES PATENT OFFICE 2,678,870

MANUFACTURE OF REFRACTORY METAL BORIDES

Hugh S. Cooper, Shaker Heights, Ohio, assignor to Walter M. Weil, Cleveland, Ohio No Drawing. Application June 21, 1950, Serial No. 169,530

20 Claims. (Cl. 23—14.5)

This invention relates to refractory metal borides and particularly to methods of making the same.

The borides of calcium, carbon, and chromium are more or less well known and have achieved some commercial importance for use as deoxidizers, abrasives and in hard facing operations. In general, however, little is known about other metal borides, particularly those of the so-called refractory metals. As far as I am aware, borides other than those of calcium, carbon, and chromium have received little attention in the literature and presumably most of them have never been prepared in anything approaching a pure form. This is probably due in part to the unavailability of sufficiently pure elemental boron for use as a starting material and in part to the numerous technical problems involved in producing borides by the known methods.

The borides of calcium, carbon, and chromium have been made by reduction of borates or boron oxide with carbon, silicon, or aluminum, either in an arc furnace or by thermic means. When these borides are prepared by such procedures, however, the product always contains appreciable impurities, and little is known about the true properties of these compounds.

In my copending applications Serial No. 120,414, now Patent No. 2,572,248, for Methods of Making Boron and Serial No. 120,415, now abandoned, for Production of Boron, both filed October 8, 1949, and Serial No. 169,529 filed June 21, 1950, now Patent No. 2,572,249, for Production of Elemental Boron, I have disclosed commercial methods of making elemental boron from about 96% to better than 99% purity. With the availability of elemental boron of such purity, the possibilities for numerous uses therefor have been opened up. Among the possibilities which I have investigated is the production of refractory metal borides, and particularly the borides of titanium, zirconium, thorium, columbium, and tantalum, in a commercially useful, finely powdered form. The present invention relates specifically to the production of such refractory metal borides using elemental boron as one of the starting materials.

Tantalum and columbium, for example, in elemental form, are obtainable only as coarse, granular powders and, if converted directly into borides by reaction with boron at elevated temperatures, would yield compounds equally coarse and extremely difficult to reduce to a fine powder without serious contamination during the grinding operation. Zirconium and titanium, on the other hand, are too active chemically to be used in the elemental state. Because of their extreme activity, both of these metals, when in granular or finely divided form, are required to be shipped in a water-wet condition. It is impractical, therefore, to use any of these metals in their elemental forms as starting materials in the production of their borides. Also, because of the stability of their oxides, reaction of the oxides with boron is virtually impossible.

I have found that the borides of titanium, zirconium, thorium, columbium, and tantalum, however, may be formed by starting with the hydrides of these refractory metals, which are air stable and are obtainable commercially in a finely divided form. The hydrides of titanium, zirconium, thorium, columbium, and tantalum are readily produced by reduction of their oxides with calcium hydride. The resulting hydrides of these refractory metals begin to break down and evolve hydrogen at temperatures above about 600° C., and at about 1400° C., very little, if any, hydrogen is retained thereby. During this break down, the free metal is liberated in nascent form.

According to the present invention, the hydride of any of these refractory metals mentioned, in a finely divided form preferably smaller than 300 mesh, is first thoroughly mixed in about stoichiometric proportions with powdered boron of similar fineness, and the mixture is pressed into small briquettes. While the size of the briquettes is not critical, I prefer that they be about 1¾ inches in their largest linear dimension and weigh about 50 grams when using the small equipment hereinafter described.

A suitable furnace chamber is heated to a temperature of about 1000° to about 1500° C. and scavenged with hydrogen gas to remove all oxygen and provide a hydrogen atmosphere therein. The previously prepared briquettes are then dropped into the furnace in relatively small quantities, which may vary according to the volume of the furnace chamber and the particular metal hydride employed. The hydride quickly decomposes at the high furnace temperature, and the metal of the hydride combines directly and exothermically with the boron to produce the corresponding metal boride.

In the case of titanium hydride, the decomposition of the hydride and reaction with the boron is very violent and highly exothermic, and it is for this reason that only small amounts of the hydride are introduced at a time into a previously heated furnace, rather than putting the entire charge into a cold furnace and bringing it up to the reaction temperature. When using zirconium hydride, the reaction is somewhat less violent and less exothermic, though still enough to render the portionwise addition of the briquettes highly desirable to avoid blowing the charge out of the furnace. The other refractory metals of present interest, namely, thorium, columbium, and tantalum, appear to be quite comparable with zirconium in the violence of their reactivity with boron and may be charged into the furnace in similar quantities. The larger the furnace chamber, of course, the larger is the amount of charge that can safely be introduced at one time.

After each addition of a portion of the total furnace charge, the reaction is allowed to subside before the next addition is made. Since the reaction is exothermic in all cases, the furnace temperature will generally rise sharply during the process and may reach a point several hundred degrees above the prevailing temperature at the time of the first addition of charge material. When charging of the briquettes into the furnace has been completed, the temperature of the furnace is preferably maintained at about 1500 to 1600° C. for a soaking period of about one to two hours to insure completion of the reaction. The application of heat is then terminated to permit the mass to cool to room temperature in the furnace chamber, the hydrogen atmosphere preferably being maintained during most of the required cooling time.

Upon removal from the furnace, the reaction mass is in the form of gray, crystalline, fairly coherent agglomerates which may be pulverized and sifted for size grading to put the product in suitable form for use. Because of their extreme hardness, these refractory metal borides give promise of great utility for most of the present uses of the various, hard, metal carbides. They should be highly useful in finely divided form as optical polishing materials, as abrasives in compacted and sintered form, with or without binding or cementing agents, and as materials of construction by powder metallurgical methods in the production of wear resistant dies, tools, and machine parts of various kinds.

For a better understanding of the invention, reference may be made to the following illustrative examples of the preparation of refractory metal borides. In each of these examples the apparatus consisted of an electrical resistance furnace in the form of a vertically disposed Alundum tube wrapped with a molybdenum resistance wire, the whole being encased in a heat insulating outer shell enclosing the sides and bottom of the Alundum tube. The open top of the Alundum tube was adapted to receive a cylindrical crucible for holding the reaction materials, and an Alundum crucible having inside dimensions of about 1¾ inches in diameter and 6½ inches in height was employed in Examples 1 and 2. Hydrogen gas was introduced into the furnace through its base in a constant stream. A fireclay cover having an exhaust tube therein was placed over the top of the furnace and hydrogen gas issuing from the exhaust tube was burned as a continuous flame. Additions of charge material to the crucible were made by sliding the cover partially to one side, dropping in the charge material, and sliding the cover back in place. The hydrogen escaping around the side of the cover during this operation ignited from the exhaust tube flame and burned freely, thus indicating an adequate supply of hydrogen in the furnace.

Example 1

$TiH_2 + B \rightarrow TiB + H_2$ (probable)

250 grams of titanium hydride powder (analyzing 99% pure) and 58 grams of elemental boron powder (analyzing about 96% pure) were thoroughly mixed together in a small ball mill. The powders were about the same in particle size, both being less than 325 mesh. Slightly more than the stoichiometric amount of boron was used to allow for assumed minor inaccuracies in the analysis of the boron and any slight loss of elemental boron that may have been due to oxidation. The intimately mixed powders from the ball mill were pressed into briquettes in the form of discs about 1¾ inches in diameter and about ¼ inch thick and weighing about 50 grams. The furnace was brought up to a temperature in the range of 1250° to 1350° C., and the entire quantity of the previously prepared briquettes was added portionwise, about 50 grams at a time at 15 minute intervals, each briquette being broken in half just before dropping it into the crucible. These intervals were sufficient for the almost explosive reaction to subside after each addition. By the time all of the material had been added, the temperature had risen to about 1700° C., and was held at about 1600° C. for another two hours to insure completion of the reaction. Because of the highly exothermic nature of the reaction, it was obvious that it must have gone substantially to completion.

Because of the extreme properties of the titanium boride produced as described, many of its properties are most difficult to measure. It is extremely resistant to the common single acids, though it can be dissolved with a mixture of nitric acid and hydrofluoric acid. Its hardness is above 9 on the Mohs scale, being roughly comparable in hardness to tungsten carbide. Its melting point is above 3000° C., compared to a melting point of about 3000° C. for zirconium boride, one of the highest melting metal compositions tested heretofore for use in making certain parts in jet propulsion and rocket propulsion power plants.

Based on the use of 1 mol of titanium and 1 mol of boron in making this material, and upon the exothermic reaction that obviously went to completion, the product may be represented by the formula TiB, as noted above, though it may be questionable whether the product is accurately represented by this formula. That a true chemical combination of titanium and boron occurred is certain. However, the literature on metal borides is so meager and so indefinite, and the analysis problem is so difficult that positive identification of the formula for the product is not possible at this time. For instance, the product could be a solution of $TiB_2$ in titanium. In view of this uncertainty, I prefer to define the product, which I believe to be novel, as a homogeneous, substantially pure, combination of titanium and boron, though, for simplicity, the product is also referred to herein as "titanium boride" or a "boride of titanium."

Example 2

$ZrH_2 + 2B \rightarrow ZrB_2 + H_2$ (probable)

400 grams of zirconium hydride powder (analyzing 99% pure) and 100 grams of boron (analyzing about 98% pure) were thoroughly mixed in a ball mill and briquetted in the same manner as the ingredients employed in Example 1. The initial furnace temperatures employed and the rate of addition of material were also substantially the same as in Example 1, though the temperature rise during the reaction was substantially less than in Example 1, reaching only about 1550° C.

The zirconium boride product was similar in appearance to the titanium boride product in Example 1, and was pulverized and sifted, yielding 99% of material finer than 200 mesh, the remainder being retained on a 100 mesh screen.

*Example 3*

TaH+2B→TaB₂+H (probable)

241 grams of tantalum hydride powder (analyzing 99% pure) and 32 grams of boron (analyzing about 96% pure) were thoroughly mixed and briquetted as in the preceding examples, and the briquettes were added to a similar, but smaller, furnace in the same manner as before while employing the same starting temperature in the furnace. In this example the Alundum crucible was 1 inch in inside diameter and 3 inches deep. The heat of the reaction raised the furnace temperature to about 1600° C. The product was similar in appearance to the products of Examples 1 and 2 and was readily reduced to a powder passing through a 200 mesh screen.

*Example 4*

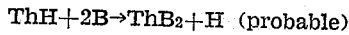
ThH+2B→ThB₂+H (probable)

23.3 grams of thorium hydride powder (analyzing better than 99% pure) and 2 grams of boron (analyzing about 99.5% pure) were thoroughly mixed and pressed into a single small briquette which was added in one piece to the small furnace of Example 3, heated to the same starting temperature of 1250 to 1300° C. As in the previous examples, the reaction demonstrated itself to be exothermic, the heat of the reaction causing a substantial rise in the furnace temperature during the reaction. About the same soaking time and temperature were employed as before. The thorium boride product was similar in appearance to the products of the preceding examples and was readily reduced to a powder passing through a 200 mesh screen.

*Example 5*

CbH+2B→CbB₂+H (probable)

18.8 grams of columbium hydride powder (analyzing 99% pure) and 4.4 grams of boron (analyzing about 99.3% pure) were thoroughly mixed, briquetted, and added to the small furnace in the same manner as in Example 4, while employing the same procedure and furnace temperatures. As in the previous examples, the reaction demonstrated itself to be exothermic, the heat of the reaction causing a substantial rise in the furnace temperature. The columbium boride product was similar in appearance to the products of the preceding examples and was readily reduced to a powder passing through a 200 mesh screen.

In Examples 2 to 5, as in Example 1, the products were very hard, high melting, and highly inert. The same problems exist in positively identifying the product formulae, though there is somewhat more evidence in the literature that the probable product formula given in each of the last four examples is the correct one. It should be understood that, throughout this application, the term "boride" is necessarily used somewhat loosely in view of the uncertainties as to the exact composition of the products made.

From the foregoing description of the invention, it will be apparent that I have discovered a simple and effective procedure for producing substantially pure homogeneous, chemical combinations of boron with a number of refractory metals that are capable of forming hydrides. The character of the reaction and the reactants employed are such that there is very little opportunity for contamination of the product, and the purity of the products is substantially the same as the purity of the ingredients employed. The fineness of the particle size of the products renders them highly suitable for most of the industrial uses for extremely hard and inert compounds of this general character.

While I have referred specifically to producing chemical combinations of boron with titanium, zirconium, thorium, columbium, and tantalum, it will be noted that these last five metals all fall in either group IV$a$ or V$a$ of the periodic table. For purposes of definition of the invention, therefore, the methods disclosed may be said to be suitable for reacting boron with those metals which are capable of forming hydrides and which fall in groups IV$a$ and V$a$ of the periodic table.

While the invention has been illustrated by reference to certain specific examples, it will be understood that the details of the procedures described may be varied without departing from the true spirit and scope of the invention as defined in the appended claims.

I claim:

1. The method of making metal borides which comprises introducing an intimate mixture of elemental boron and the hydride of a metal selected from the class consisting of titanium, zirconium, thorium, columbium, and tantalum into an atmosphere consisting substantially entirely of hydrogen in a furnace chamber preheated to a temperature, in the range from about 1000° to about 2000° C., sufficient to decompose the hydride and effect combination of the boron and said selected metal.

2. The method of making metal borides which comprises introducing an intimate mixture of elemental boron and the hydride of a metal selected from the class consisting of titanium, zirconium, thorium, columbium, and tantalum into an atmosphere consisting substantially entirely of hydrogen in a furnace chamber preheated to a temperature, in the range from about 1000° to about 2000° C., sufficient to decompose the hydride and effect combination of the boron and said selected metal, and maintaining the temperature in said range until reaction between the two metals has subsided.

3. The process of claim 2 in which said intimate mixture is in the form of briquetted powders of the component materials.

4. The process of claim 2 in which said intimate mixture is in the form of briquetted powders of the component materials present in substantially stoichiometric proportions.

5. The process of claim 2 in which said intimate mixture is in the form of briquetted powders of the component materials present in substantially stoichiometric proportions, the briquetted mixture being introduced portionwise at intervals into said hydrogen atmosphere to minimize the explosive violence of the resulting reaction.

6. The method of making borides of metals from groups IVa and Va of the periodic table which are capable of forming hydrides, said method comprising providing an atmosphere consisting substantially entirely of hydrogen in an enclosed furnace chamber pre-heated to a temperature in the range from about 1000° C. to about 2000° C., and introducing into said hydrogen atmosphere at intervals a briquetted intimate mixture of powders of elemental boron and one of said hydrides.

7. The method of claim 6 in which the hydride is titanium hydride.

8. The method of claim 6 in which the hydride is zirconium hydride.

9. The method of claim 6 in which the hydride is thorium hydride.

10. The method of claim 6 in which the hydride is columbium hydride.

11. The method of claim 6 in which the hydride is tantalum hydride.

12. The method of making borides of metals from groups IVa and Va of the periodic table which are capable of forming hydrides, said method comprising providing an atmosphere consisting substantially entirely of hydrogen in an enclosed furnace chamber pre-heated to a temperature in the range from about 1000° C. to about 2000° C., and introducing into said hydrogen atmosphere at intervals a briquetted intimate mixture of powders of elemental boron and one of said hydrides, permitting the temperature within said chamber to rise from the resulting exothermic reaction, and maintaining the temperature of said furnace chamber above the minimum of said range until said reaction has subsided while also maintaining the hydrogen atmosphere therein.

13. A method for making borides of titanium, zirconium, thorium, columbium, and tantalum which comprises introducing an intimate mixture of a hydride of one of said metals with elemental boron into an atmosphere consisting substantially entirely of hydrogen in a furnace chamber pre-heated to a temperature in the range of about 1000° to about 2000° C.

14. A method for making borides of titanium, zirconium, thorium, columbium, and tantalum which comprises introducing an intimate mixture of a hydride of one of said metals with elemental boron into an atmosphere consisting substantially entirely of hydrogen in a furnace chamber pre-heated to a temperature in the range of about 1000° to about 2000° C., said mixture being in the form of finely divided powders of the components thereof pressed into briquettes.

15. A method suitable for making borides of titanium, zirconium, thorium, columbium, and tantalum which comprises introducing an intimate mixture of a hydride of one of said metals with elemental boron into an atmosphere consisting substantially entirely of hydrogen in a furnace chamber pre-heated to a temperature in the range of about 1000° to about 2000° C., said mixture being in the form of finely divided powders of the components thereof pressed into briquettes and being introduced into said atmosphere incrementally at intervals to minimize the explosive violence of the resulting exothermic boride forming reaction, and maintaining the temperature of said furnace chamber above about 1400° C. until said reaction has reached substantial completion following the last addition of reactants.

16. The method of claim 15 in which the hydride is titanium hydride.

17. The method of claim 15 in which the hydride is zirconium hydride.

18. The method of claim 15 in which the hydride is thorium hydride.

19. The method of claim 15 in which the hydride is columbium hydride.

20. The method of claim 15 in which the hydride is tantalum hydride.

References Cited in the file of this patent

UNITED STATES PATENTS

| Number | Name | Date |
|---|---|---|
| 1,129,507 | Peacock | Feb. 23, 1915 |
| 1,835,024 | Driggs | Dec. 8, 1931 |
| 2,534,676 | Newton et al. | Dec. 19, 1950 |

OTHER REFERENCES

Mossan, Comptes Rendus, volume 120, pages 290-296 at 293, (1895) (Copy in Scientific Library.)

Tucker, et al., Journal of the Chemical Society, volume 81, pages 14-17, (1902) (Copy in Scientific Library.)

Zalkin et al., The Crystal Structure of $CeB_4$, $ThB_4$, and $UB_4$; Atomic Energy Commission Declassified No. AECD 2762, Nov. 22, 1949. Atomic Energy Commission, Technical Information Branch, Oak Ridge, Tennessee (Copy in Scientific Library.)

Brewer et al., The Borides of Uranium and Thorium, Atomic Energy Commission Declassified AECD-2823, Feb. 14, 1950, Atomic Energy Commission, Technical Information Branch, Oak Ridge, Tennessee (Copy in Scientific Library.)